United States Patent
Kempf et al.

(10) Patent No.: US 12,469,475 B2
(45) Date of Patent: Nov. 11, 2025

(54) SYSTEM AND METHOD FOR COLOR PROCESSING

(71) Applicant: Texas Instruments Incorporated, Dallas, TX (US)

(72) Inventors: Jeffrey Kempf, Dallas, TX (US); Gregory S. Pettitt, Durant, OK (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 489 days.

(21) Appl. No.: 18/158,119

(22) Filed: Jan. 23, 2023

(65) Prior Publication Data

US 2024/0249699 A1 Jul. 25, 2024

(51) Int. Cl.

| | |
|---|---|
| G09G 5/02 | (2006.01) |
| G09G 5/06 | (2006.01) |
| G09G 5/10 | (2006.01) |
| H04N 1/60 | (2006.01) |
| H04N 5/57 | (2006.01) |
| H04N 9/00 | (2006.01) |

(Continued)

(52) U.S. Cl.
CPC ............ G09G 5/06 (2013.01); *G02F 2203/00* (2013.01); *G09G 2320/0666* (2013.01)

(58) Field of Classification Search
CPC ............ G09G 5/02; G09G 5/06; G09G 5/028; G09G 5/10; G09G 5/30; G09G 2320/00; G09G 2320/02; G09G 2320/0242; G09G 2320/0271; G09G 2320/0276; G09G 2320/0285; G09G 2320/04; G09G 2320/0295; G09G 2320/06; G09G 2320/0633; G09G 2320/064; G09G 2320/0666; G09G 2320/0673; G09G 2320/0693; H04N 1/56–60; H04N 1/6019; H04N 1/6025; H04N 1/6027; H04N 1/40; H04N 1/57; H04N 9/00–03; H04N 9/3179; H04N 9/64–78; G02F 1/13
See application file for complete search history.

(56) References Cited

U.S. PATENT DOCUMENTS

| | | | | |
|---|---|---|---|---|
| 9,530,382 | B2 * | 12/2016 | Simmons | G02B 27/0179 |
| 2007/0268459 | A1 * | 11/2007 | Childers | H04N 9/3117 |
| | | | | 353/31 |

(Continued)

FOREIGN PATENT DOCUMENTS

CN 104332143 B * 6/2017 ............ G09G 5/02

*Primary Examiner* — Wesner Sajous (74) *Attorney, Agent, or Firm* — Michael T. Gabrik; Frank D. Cimino (57) ABSTRACT

A system includes a spatial light modulator (SLM) and a circuit including a processor. The SLM includes pixel elements. The circuit is configured to convert M primary video signals to N multi-primary video signals. The circuit is configured to use a first multi-primary video signal to derive a first additive offset to a first primary video signal, to use the first multi-primary video signal to derive a second additive offset to a second primary video signal of the M primary video signals, to add the first additive offset to the first primary video signal, to add the second additive offset to the second primary video signal, and to derive a bit plane based on the first primary signal having the first additive offset added thereto and to transmit the bit plane to the SLM to selectively control on and off states of the pixel elements of the SLM.

20 Claims, 7 Drawing Sheets

(51) Int. Cl.
  *H04N 9/31*  (2006.01)
  *H04N 9/64*  (2023.01)
  *H04N 9/71*  (2006.01)

(56) References Cited

U.S. PATENT DOCUMENTS

2009/0201418 A1* 8/2009 Endo .................... H04N 9/3111
  348/453
2016/0086071 A1* 3/2016 Fang .................... G06K 7/1417
  235/462.04

* cited by examiner

FIG. 7 ns. The ASIC further includes
SYSTEM AND METHOD FOR COLOR PROCESSING

BACKGROUND

Display systems are used in a myriad of electronic devices, such as projectors, televisions, computer monitors, laptops, near-eye displays, smart headlights, heads up displays, smart appliances, and smartphones. A spatial light modulator (SLM) used in a video display can control a plurality of individual elements in the final image, one for each pixel. With an SLM, color is controlled by the light that illuminates the display surface. For certain SLMs, the light illuminating the individual elements is already tinged with a color, for example by using either a white light source and some type of color filter or a colored light source. Some display systems use spatial light modulation to display colored images. Various devices can implement spatial light modulation, such as one or more digital micromirror devices (DMD), liquid crystal displays (LCD), liquid crystal on silicon (LCoS), and so forth.

SUMMARY

The present disclosure relates generally to signal processing engines for display systems, and more particularly to optimized and real-time conversion of primary display signals to multi-primary display signals.

In one example, a display system includes a spatial light modulator (SLM) and a circuit including a control processor. The SLM includes pixel elements. The circuit is communicatively coupled to the SLM. The circuit is configured to convert M primary video signals to N multi-primary video signals, wherein N and M are positive integers and N is greater than M. The circuit is further configured to use a first multi-primary video signal of the N multi-primary video signals to derive a first additive offset to a first primary video signal of the M primary video signals. The circuit is further configured to use the first multi-primary video signal to derive a second additive offset to a second primary video signal of the M primary video signals. The circuit is further configured to add the first additive offset to the first primary video signal. The circuit is further configured to add the second additive offset to the second primary video signal. The circuit is further configured to derive a bit plane based on the first primary signal having the first additive offset added thereto. The circuit is further configured to transmit the bit plane to the SLM to selectively control on and off states of the pixel elements of the SLM.

In another example, a method is disclosed that includes steps which may all be implemented at a circuit. The method includes converting M primary video signals to N multi-primary video signals, wherein N and M are positive integers and N is greater than M. The method further includes using a first multi-primary video signal of the N multi-primary video signals to derive a first additive offset to a first primary video signal of the M primary video signals. The method further includes sing the first multi-primary video signal to derive a second additive offset to a second primary video signal of the M primary video signals. The method further includes adding the first additive offset to the first primary video signal. The method further includes adding the second additive offset to the second primary video signal.

In other example, an application-specific integrated circuit (ASIC) is disclosed. The ASIC includes an input configured to receive M primary video signals. The ASIC further includes an output configured to output a plurality of bit planes. Each bit plane corresponds to a respective one of N multi-primary video signals, where N and M are positive integers and N is greater than M. The ASIC further includes a control processor configured to use a first multi-primary video signal of the N multi-primary video signals to derive first, second, and third additive offsets for a first primary video signal of the M primary video signals. The control processor is further configured to use the first multi-primary video signal to derive a fourth, fifth and sixth additive offsets for a second primary video signal of the M primary video signals. The control processor is further configured to add the first, second, and third additive offsets to the first primary video signal. The control processor is further configured to add the fourth, fifth, and sixth additive offsets to the second primary video signal. The control processor is further configured to derive a bit plane of the plurality of bit planes based on the first, second and third additive offsets added to the first primary video signal and the fourth, fifth and sixth additive offsets added to the second primary video signal.

BRIEF DESCRIPTION OF THE DRAWINGS

The same reference numbers or other reference designators are used in the drawings to designate the same or similar (functionally and/or structurally) features. Also, the figures are not necessarily drawn to scale.

DETAILED DESCRIPTION

Figure 1A:
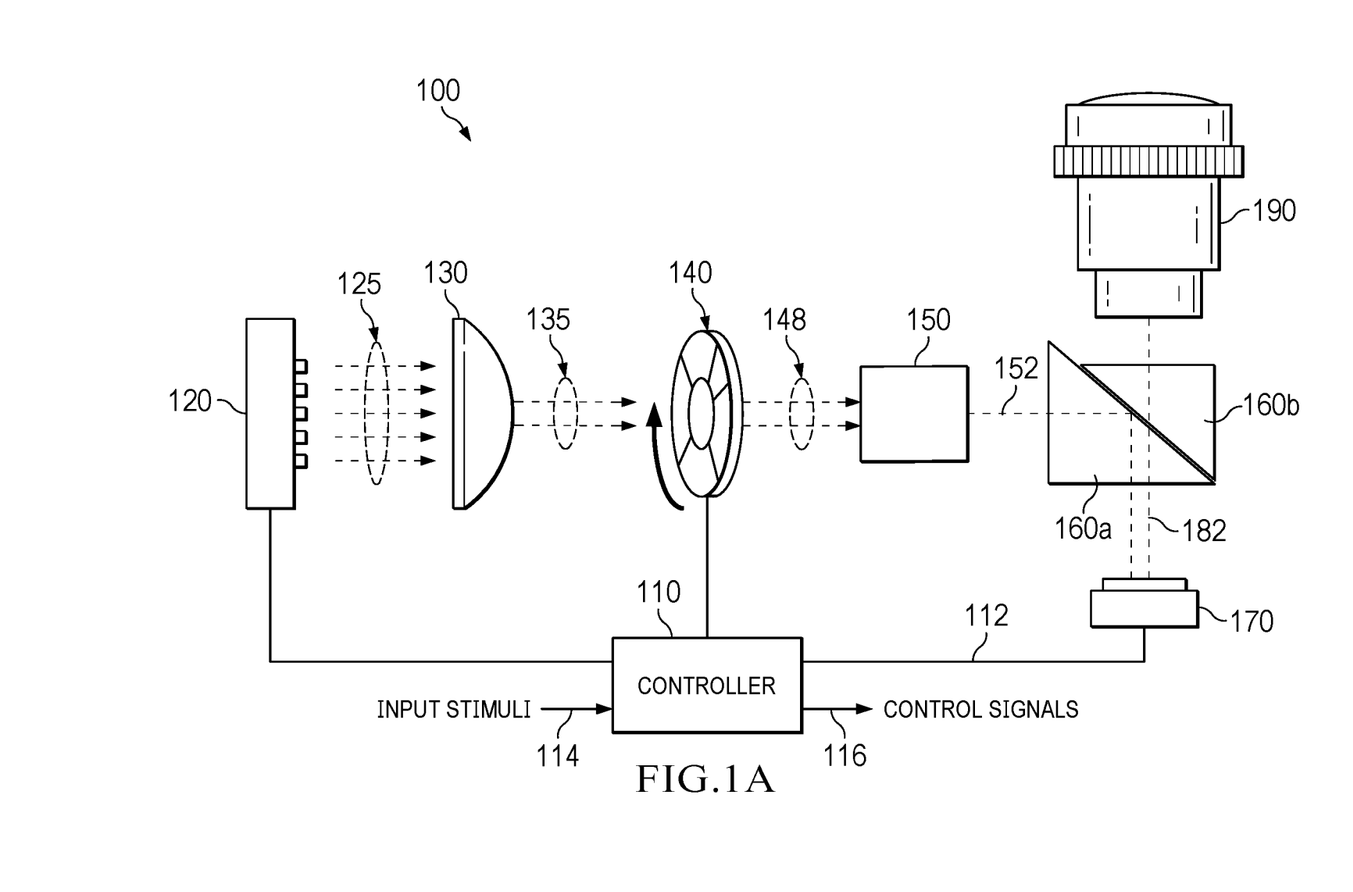
FIG. 1A illustrates a portion of a display system according to one example.

FIG. 1A illustrates a portion of a display system 100. In this example, display system 100 includes one or more of each of the following components: a controller 110, a light source 120, a lens 130, a color wheel 140, a light integrator 150, an optical assembly 160a-b, a SLM 170, and a projection lens 190.

Controller 110 is communicatively coupled to and capable of controlling operation of one or more other components of display system 100 (e.g., light source 120, color wheel 140, or SLM 170). For example, controller 110 can include any suitable combination of hardware and software or other logic capable of interfacing with SLM 170 via a bus 112. In this example, controller 110 is an application-specific integrated circuit (ASIC) programmed to process input stimuli 114 and output control signals 116 that control operation of SLM 170. The input stimuli 114 may include, for example, received spatial information corresponding to an image or a video stream. The generation of control signals 116 may involve controller 110 executing one or more algorithms for upconverting input stimuli 114 having M primary signals into control signals 116 corresponding to N multi-primary signals, where N is greater than M. Additional detail of example upconverting algorithm(s) implemented by controller 110 are explained further herein with reference to FIGS. 2 through 7.

Display system 100 includes certain components 120, 130, 140, 150, 160, 170, and 190 that are optically coupled to one another along a light path extending from light source 120 to projection lens 190. Light source 120 refers to any device(s) capable of generating light beams 125 (e.g., in response to control signaling received from controller 110). For example, light source 120 can include one or more light-emitting diodes (LEDs), lasers, or arc lamps. In some embodiments, light source 120 provides white light beams 125, which are selectively filter by other components of display system 100 (e.g., by color wheel 140). In other embodiments, light source 120 provide blue light beams 125, which are converted to other colors by other components of display system 100 (e.g., by color wheel 140 which contains phosphor elements). In some embodiments, light source 120 may include multiple devices (e.g., lasers or LEDs), each capable of providing a respective color of light beams 125. Light beams 125 are provided to lens 130.

Lens 130 refers to any suitable optical device(s) capable of transmitting incident light beams in in a manner that concentrates, diverges, refracts, diffracts, redirects, reshapes, integrates or reflects incident light beams 125 the beam. In the illustrated example, lens 130 concentrates light beams 125 and provides focused light beams 135 to a portion of color wheel 140.

Figure 1B:
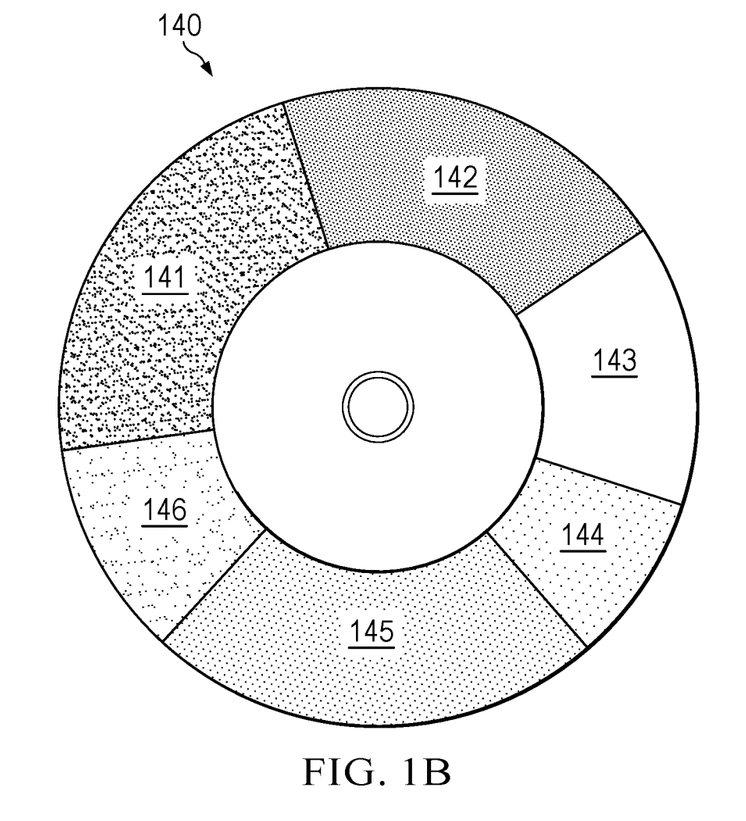
FIG. 1B illustrates a perspective view of a color wheel of the display system of FIG. 1A according to one example.

FIG. 1B illustrates a perspective view of the color wheel 140 of FIG. 1A. As shown in FIG. 1B, color wheel 140 has a disc or annular shape divided into multiple segments 141-146. Segments 141-146 may vary in size. Color wheel 140 spins at a controlled speed (e.g., in response to control signaling received from controller 110) to allow each segment 141-146 to sequentially receive light beams 135 and output light beams 148 corresponding to that segment. In some examples, segments 141, 142, 143, 144, 145 and 146 can output red, blue, white, cyan, green and yellow light, respectively. In some examples, segments 141, 142, 143, 144, 145 and 146 may output red, blue, magenta, cyan, green and yellow light, respectively. In some examples, segments 141, 142, 143, 144, 145 or 146 contain a phosphor to transform the wavelength of light, such as a yellow or a green phosphor segment. Any suitable number of segments having any suitable size or filtration color, or having no color filtration (e.g., white), may be used.

Light integrator 150 refers to any device(s) that can receive light beams 148, integrate light beams 148 (e.g., using internal reflective surfaces), and output integrated light beams 152. Integrated light beams 152 are directed to optical assembly 160a-b.

Optical assembly 160a-b refers to any device(s) capable of directing integrated light beams 152 to a surface of SLM 170 and directing spatially-modulated light beams 182 outputted by SLM 170 to projection lens 190. In this example, optical assembly includes two total internal reflection (TIR) prisms 160a and 160b. As shown in FIG. 1A, TIR prism 160a has a face at which light at some angles undergoes total internal reflection (e.g., the reflection of integrated light beams 152 off an internal surface of prism 160a). Light received at other angles (e.g., light beams 182) passes through the same face of TIR prism 160a. TIR prism 160b is arranged in a manner that enables the direction of light beams 182 (received from prism 160a) toward projection lens 190.

SLM 170 refers to any device(s) capable of spatially-modulating light. In this example, the spatially-modulate light beams 182 outputted by SLM 170 are directed though optical assembly 160a-b to projection lens 190. In some embodiments, SLM 170 outputs modulated light beams 182 by selective redirection using reflective LCoS technology. In some embodiments, SLM 170 selectively transmits light beams 182 using a liquid crystal panel or an interferometric modulator. Although FIG. 1A illustrates SLM 170 using reflection to output light beams 182, in some alternative embodiments SLM 170 can output modulated light beams 182 using transmissive technology (e.g., transmissive LCoS). The spatial modulation of SLM 170 may be either digital or analog.

In the illustrated example, SLM 170 includes one or more DMDs, each having an array of deformable micromirrors. Controller 110 may digitize input stimuli 114 into samples with a predetermined number of bits for each pixel of a display. Controller 110 may then send control signals 116 to SLM 170 that sets individual micromirrors to either an on state or an off state corresponding to image data of the input stimuli.

In some examples, control signals 116 are organized into binary bit planes. As used herein, a "bit plane" refers to a binary image temporarily loaded onto SLM 170, in which each pixel of a given SLM 170 is respectively loaded with either a 0 or a 1 (i.e., off or on, respectively). In the context of a DMD, a bit plane loads each deformable micromirror in a plane of micromirrors of the DMD with either a 0 or a 1. A micromirror loaded with a 0 will reflect light to a light dump. A micromirror loaded with a 1 will reflect light out of the projection lens 190 at the appropriate display pixel location. The generation of bit planes by controller 110, as described herein, is not limited to DMD-based systems only. In some embodiments, controller 110 may similarly generate bit planes for use in a display system 100 in which SLM 170 includes one or more LCD or LCOS devices, for example.

Controller 110 may be capable of processing input stimuli 114 to generate a series of bit planes for real-time display upon their creation and real-time deletion after their display. The bit planes can control SLM 170 in a manner that produces a series of displayed light beams 182 collectively having color and brightness corresponding to input stimuli 114. For example, during a timeslot dedicated to displaying red, only image data associated with red is used to set the appropriate on or off state of each micromirror.

Where a desired pixel color being displayed is not a sufficiently close match for the output of color wheel 140, dithering techniques may be used to visually create the color. Dithering can make use of the blending of more than one color to create the desired color. For example, for a color corresponding to 50 percent of segment 141 and 50 percent of segment 142, controller 110 may generate bit planes that equally divide the "on" time for the appropriate pixels of SLM 170 during the appropriate faction of time that segments 141 and 142 are within the path of light beams 135.

The perceived brightness or intensity of a given color at any location within an image may be also modulated based on the amount of time a corresponding micromirror remains in an on state. For example, input stimuli 114 can be digitized into samples with a predetermined number of bits for each display pixel. The value for each bit of the sample depends on the perceived intensity for that pixel in that frame. For displaying an image having a pixel with a pure red color at 50 percent of the maximum intensity, the display system can generate bit planes loaded with a 1 for that pixel (setting it to an on state) for fifty percent of the time red light is made available. Because this example concerns a pure red pixel of an image, other bit planes for the same image are loaded with a zero (setting that same pixel to an off state) for that same pixel for the remainder of the time allocated to displaying that same image.

All other red pixels of the image are likewise selectively displayed and other image data is likewise selectively displayed by corresponding pixels with the appropriate brightness and color during respective timeslots. The above operations can be implemented at high speeds that are too fast for the human eye to perceive changes. Consequently, the human eye perceives a full color image as the eye integrates brightness and color over a time frame.

In some examples, controller 110 can receive and process input stimuli 114 having at least three driving signals. Examples of input stimuli 114 having three driving signals include luma-chroma (YUV), luma-chroma (blue)-chroma (red) (YcbCr), YpbPr, red-green-blue (RGB), and so forth. Input stimuli 114 having three driving signals can be expressed as three-dimensional color vectors, which may be used in weighted combination to create a full spectrum color gamut. In the context of RGB, for example, the integration of green and blue results in a perceived cyan hue.

In this example, display system 110 has a color wheel 140 with more than three segments 141-146, such that color wheel 140 is capable of sequentially providing more than three colors of light beams 148, even if input stimuli 114 only has three driving signals. By rotating its various segments 141-146 into the path of light beams 135, color wheel 140 can output different colors of light beams 148 in rapid succession. To provide respective bit planes corresponding to each segment 141-146 of color wheel 140, controller 110 is capable of upconverting input stimuli 114 having M primary driving signals (e.g., RGB) to control signals 116 based on N multi-primary signals (e.g., RGB+yellow, cyan and white or RGB+yellow, cyan and magenta), where N and M are positive integers and N is greater than M. Although the illustrated example uses color wheel 140 to selectively filter light beams 135 into multiple distinct colors, some examples may alternatively use, or additionally use, a light source 120 that can selectively provide different colors of light beams 125.

The use of additional segments 141-146 in color wheel 140 relative to the number if driving signals of input stimuli 114 can present certain design challenges. Dither quality may be impacted by the inclusion of segments within color wheel 140 that are relatively bright. For example, yellow is a relatively bright color. For certain display systems 100, yellow at full intensity may have 95% the brightness of white. Because of the relative brightness of yellow, and due to the ability of the human eye to better discern color differences at lower brightness intensities, use of dithering techniques may create noticeable artifacts in the display or "dither noise" if one of the segments 141-146 corresponding to yellow is used to create a color at low intensity. Accordingly, controller 110 may be programmed with executable algorithms that mitigate dithering noise, as explained further herein with reference to FIGS. 2 through 7.

An advantage of some examples is the potential increase in image quality achieved, in part, by an optimized use of a color wheel 140 having a number of segments 141-146 which exceed a number of driving signals included in input stimuli 114. Use of additional segments 141-146 for color wheel 140 may provide a more fulsome color palate to choose from in displaying images. Another advantage of some examples is the improvement of dither quality, or the reduction of dither noise, through the controlled use of segments 141, 142, 143, 144, 145, or 146 with increased brightness. This may be achieved by controller 110 executing algorithms that make use of less bright colors to compensate at lower intensities, as explained further herein with reference to FIGS. 2 through 7.

Certain examples provide a cost-efficient footprint in terms of hardware and algorithmic implementation for multi-primary component generation. For example, examples may have sufficiently low memory and processing requirements to enable implementation in the compressed architecture of low-cost devices (e.g., ASIC, Pico controller, etc.). In addition, examples may use a robust yet streamlined algorithm for multi-primary component generation. Optimizing the execution time for multi-primary component generation provides certain technical advantages, including addressing stringent timing needs arising from the relative fast clocking domain of converting video input stimuli to an output format useable to control the operation of one or more SLMs.

Other technical advantages of the present disclosure will be apparent to one skilled in the art from the teachings of the present disclosure. Moreover, while specific advantages have been enumerated above, various examples may include all, some, or none of the described advantages.

Figure 2:
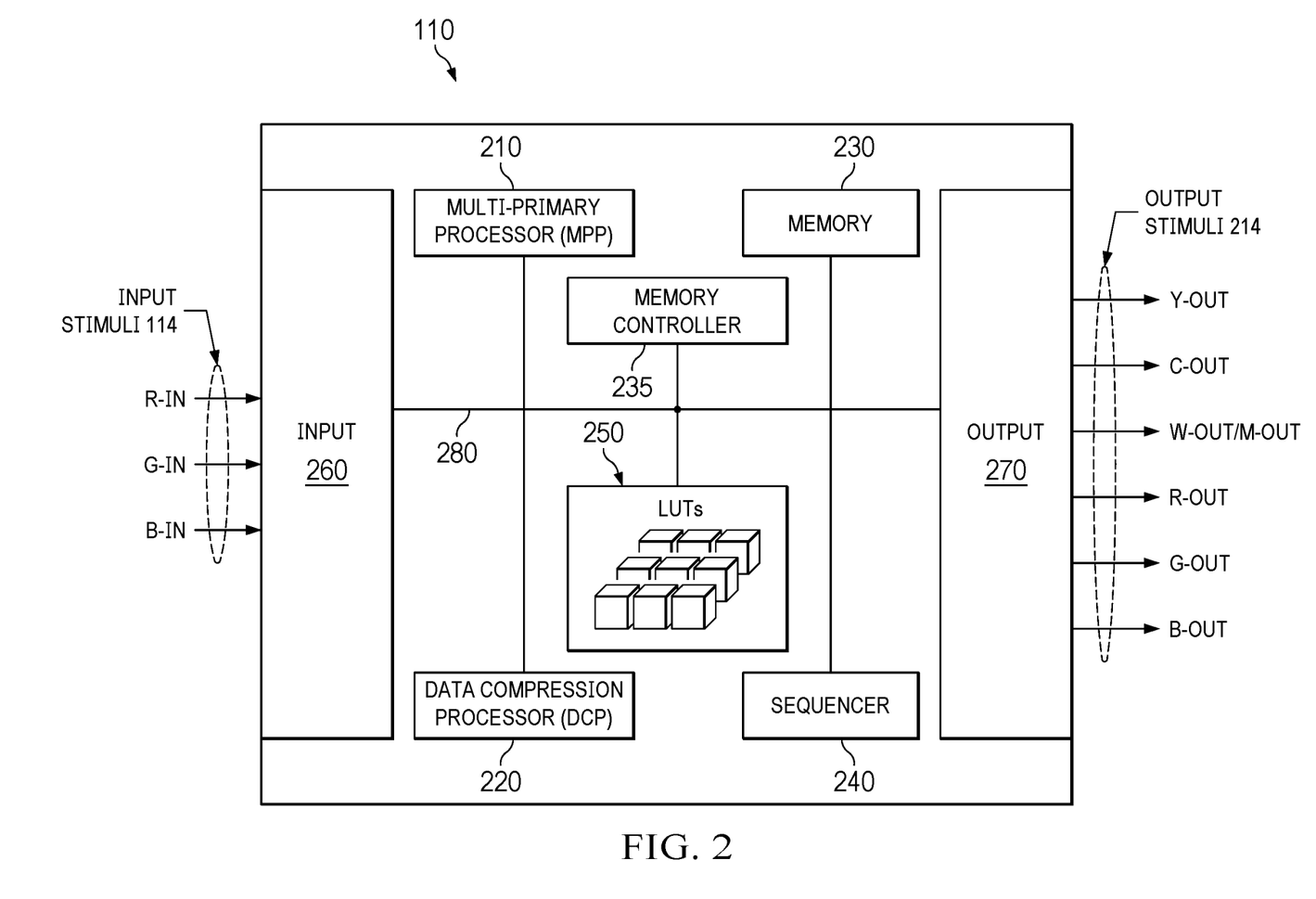
FIG. 2 illustrates additional detail of a controller of the display system of FIG. 1A according to one example.

FIG. 2 illustrates additional detail of the controller 110 of FIG. 1A according to one example. Controller 110 includes a multi-primary processor (MPP) 210, a data compression processor (DCP) 220, a memory 230, a memory controller 235, a sequencer 240, a collection of LUTs 250, an input 260, and an output 270. Controller 110 further includes a bus 280 enabling the illustrated components 210, 230, 235, 240, 250, 260, and 270 of controller 110 to interface with one another.

In some examples, MPP 210, DCP 220, memory 230, memory controller 235, sequencer 240, LUTs 250, input 260, output 270, and bus 280 are included within one or more circuits, such as one or more ASICs. The circuit can be configured to perform certain operations. For example, the circuit can be configured to implement one or more of the following operations in any suitable order: (1) convert M primary video signals to N multi-primary video signals, wherein N and M are positive integers and N is greater than M; (2) use a first multi-primary video signal of the N multi-primary video signals to derive a first additive offset for a first primary video signal of the M primary video signals; (3) use the first multi-primary video signal to derive a second additive offset for a second primary video signal of the M primary video signals; (4) add the first additive offset to the first primary video signal; (5) add the second additive offset to the second primary video signal; (6) derive a bit plane based on the first primary signal having the first additive offset added thereto and (7) transmit the bit plane to the SLM to selectively control on and off states of the pixel elements of the SLM. In some embodiments, controller 110 may itself be implemented as a circuit having all or some of the above enumerated functionality.

Input 260 refers to any device(s) capable of receiving input stimuli 114 from a source external to controller 110.

Output 270 refers to any device(s) capable of transmitting output stimuli 214 to a source external to controller 110 (e.g., to SLM 170). In some embodiments, input 260 and output 270 may collectively be part of an I/O of an ASIC.

MPP 210 refers to one or more processors programmed to execute certain logic, including one or more executable algorithms for processing input stimuli 114 to generate output stimuli 214. The processing may involve upconverting M primary input signals of input stimuli 114 to N multi-primary output signals of output stimuli 214, where N and M are positive integers and N is greater than M. As shown in FIG. 2, for example, MPP 210 processes input stimuli 114 having three primary driving signals (R-IN, G-IN, and B-IN) to generate output stimuli 214 corresponding to at least six multi-primary signals (Y-OUT, C-OUT, R-OUT, W-OUT/M-OUT, G-OUT and B-OUT). Each multi-primary signal may contain a respective series of bit plane instructions for purposes of controlling the binary states of SLM 170. Additional operational aspects of controller 110, including example algorithm(s) it may be programmed to execute, are explained further with reference to FIGS. 3 and 4.

DCP 220 refers to one or more processors programmed to execute certain logic, including one or more executable algorithms for applying compression or decompression to a data stream including input stimuli 114. Descriptions of example data compression and decompression techniques and algorithms that may be used by DCP 220 are disclosed in commonly-assigned U.S. Patent App. Pub. No. 2022/004446 by Kempf et al., which is incorporated herein by reference in its entirety.

In some examples, input stimuli 114 may include images encoded with 24 bits per pixel, which may be divided into 8 bits per primary color if three primary colors are used (e.g., RGB). DCP 220 applies compression techniques and algorithms that can reduce the number of encoded bits per pixel, such as compression that reduces 24 bits per pixel to 7 bits per pixel, for example.

The compression by DCP 220 may involve applying a conversion of input stimuli 114 having a linear format to input stimuli having a non-linear or logarithmic format, or vice versa. For example, the compression applied by DCP 220 may involve converting input stimuli 114 having a linear format into a compressed encoding having a non-linear or logarithmic gamma format, in which more code segments are assigned to the darker portion of the dynamic range than the brighter portion of the dynamic range. Such gamma format encoding can be designed to be responsive to human vision, which is generally more discerning of darker grey shades than brighter grey shades. In some embodiments, converting input stimuli 114 having a linear format to input stimuli having a non-linear format may result in improved compression in terms of bits per pixel.

In some examples, DCP 220 applies compression to a data stream including input stimuli 114 as it arrives at input 260. Thus, the compression by DCP 220 may be executed before the input stimuli 114 is stored in memory 230 and before MPP 210 executes upconverting processes thereon. Applying compression to input stimuli 114 can reduce the total amount of memory 230 used to store input stimuli 114. Reducing the total amount of memory 230 may reduce the size and cost of controller 110. In addition, applying compression by DCP 220 may lower the compute load requirements, which can result in lower power consumption.

Memory controller 235 refers to one or more processors programmed to read from and write to memory 230. Certain read or write operations may be responsive to requests received from MPP 210 via bus 280. Such read or write requests from MPP 210 may be initiated during the real-time creation of a bit plane, by controller 110, in which the bit plane corresponds to input stimuli 114 received at input 260.

Memory 230 refers to one or more memory devices capable of storing digital information. Such a memory device may be a read-only memory (ROM), random access memory (RAM), volatile memory, non-volatile memory, static memory, dynamic memory, flash memory, cache memory, frame memory and/or any device that stores digital information. In this example, memory 230 includes a frame store capable of buffering input stimuli 114 organized into multiple video frames, in which each frame is a single image in a sequence of images of displayable video input. Memory 230 can perform read or write operations responsive to control signals received from memory controller 235 via bus 280.

LUTs 250 refer to a collection of multi-dimensional lookup tables, each including one or more arrays of data that maps input values to output values. In some examples, each LUT 250 is implemented as a single port RAM within controller 110.

Sequencer 240 refers to any combination of hardware or software within controller 110 configured to request memory controller 235 to read new data from memory 230 for use in the real-time display thereof. Sequencer 240 may be further configured to organize bit planes generated at least in part by MPP 210 into an ordered series to be sent sequentially to SLM 170 at a rate consistent with the controlled rotation of color wheel 140. In the illustrated example, each bit plane corresponds to a respective one of Y-OUT (yellow), C-OUT (cyan), R-OUT (red), G-OUT (green), B-OUT (blue) and either W-OUT (white) or M-OUT (magenta).

Figure 3:
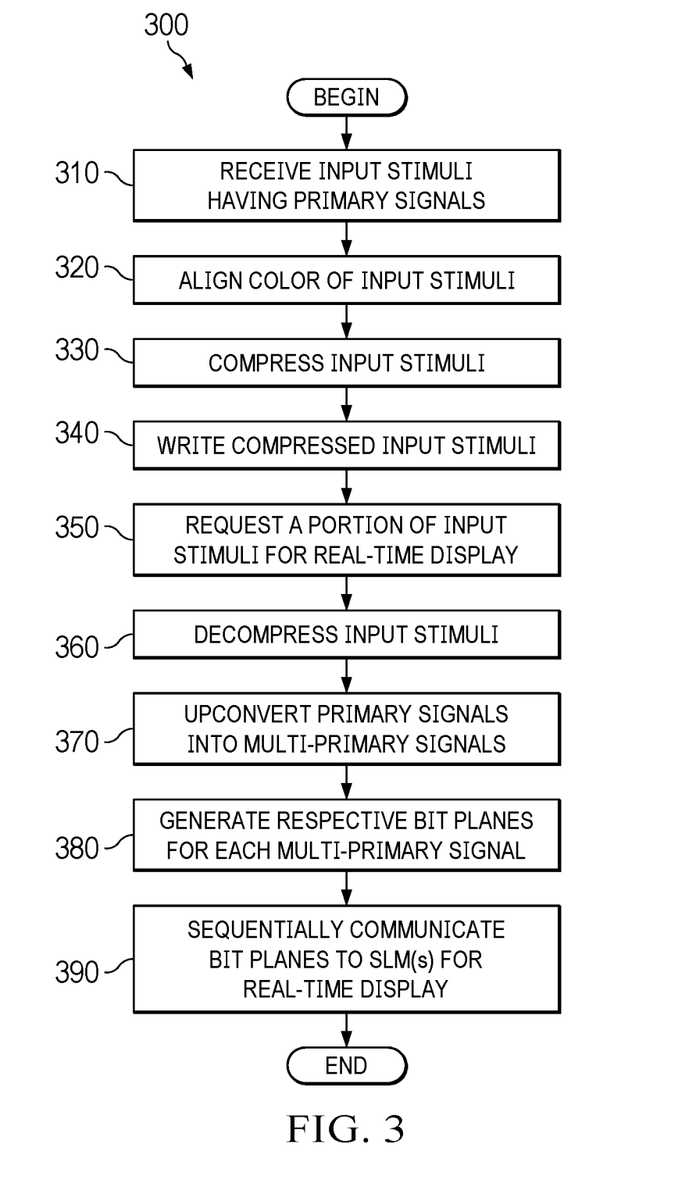
FIG. 3 is a flowchart illustrating aspects of a process for rendering control signals which control certain operations of the display system of FIG. 1A.

FIG. 3 is a flowchart 300 illustrating aspects of a process for rendering control signals which control certain operations of the display system 100 of FIG. 1A. In some examples, flowchart 300 is implemented by controller 110.

At step 310, input stimuli 114 having a number of primary signals are received by controller 110 via input 260. In certain examples, the input stimuli 114 include video input having three primary signals. However, any suitable input stimuli 114 having any suitable number of primary signals may be used. Examples of input stimuli 114 having three primary signals include RGB, YUV, YCbCr, YPbPr, and so forth.

In some examples, input stimuli 114 received by controller 110 via input 260 may be encoded as a stream of pixels, where each pixel has a respective component value for each one of several primary signals. In some examples, the pixels of a given image may be streamed in a raster fashion, such as from left to right and from top to bottom.

At step 320, input 260 communicates the received input stimuli 114 via bus 280 to MPP 210 and MPP 210 executes an algorithm to align input stimuli 114 with certain configured parameters of display system 100. In certain instances, input stimuli 114 may include an encoded image with a color gamut that does not perfectly match the color gamut of light beams 182 provided to a surface of SLM 170. For example, input stimuli 114 may include an image encoded with a red primary signal that does not match red light beams 148 outputted by one of the segments 141-146 of color wheel 140. Step 320 may involve MPP 210 using input stimuli 114 as a read address to lookup corresponding values in a corresponding alignment LUT 250. The alignment LUT 250 can be configured to correct for any mismatch between an aspect of the color gamut of input stimuli 114 and an aspect of the color gamut of light beams 182 provided to SLM 170.

At step 330, MPP 210 communicates the aligned input stimuli 114 via bus 280 to DCP 220 and DCP 220 applies compression to the input stimuli 114. As explained above with reference to DCP 220 of FIG. 2, descriptions of example data compression techniques and algorithms that may be used by DCP 220 are disclosed in commonly-assigned U.S. Patent App. Pub. No. 2022/004446 by Kempf et al.

At step 340, DCP 220 signals completion of its compression process via bus 280, which can cause memory controller 235 to manage a write operation that writes the compressed input stimuli 114 in memory 230.

At step 350, sequencer 240 sends a request via bus 280 to memory controller 235, which requests memory controller 235 to read new display data from memory 230 for use in the real-time rendering of a corresponding display thereof by display system 100. Responsive to sequencer 240 requesting new display data, memory controller 235 manages a read operation that retrieves the appropriate compressed input stimuli 114 from memory 230 and provides the read input stimuli 114 via bus to DCP 220.

At step 360, DCP 220 applies decompression to input stimuli 114 read at step 350A and outputs decompressed input stimuli 114 to multi-primary processor 210 via bus 280. As explained above with reference to DCP 220 of FIG. 2, descriptions of example data decompression techniques and algorithms that may be used by DCP 220 are disclosed in commonly-assigned U.S. Patent App. Pub. No. 2022/004446 by Kempf et al.

At step 370, upon reception of the input stimuli decompressed at step 360, MPP 210 executes a process for upconverting primary signals into multi-primary signals. The signal conversion process can involve upconverting compressed input stimuli 114 having M primary signals to multi-primary stimuli having N primary signals, where N and M are positive integers and N is greater than M.

At step 380, MPP 210 generates a series of bit planes for each multi-primary signal generated at step 370, as explained above with reference to FIGS. 1A-2. Each bit plane can be generated on the fly by MPP 210, based on a corresponding multi-primary signal. Because each bit plane is generated on the fly for immediate use in rendering a display, there is no need to permanently store the bit planes. Additional detail of an example algorithmic process for upconverting primary signals into multi-primary signals is explained herein with reference to FIG. 4.

At step 390, controller 110 uses its output 270 to sequentially communicates bit planes to SLM 170 for real-time display. The bit planes may be communicated upon their generation at step 380. Alternatively, MPP 210 may interface with memory controller 235 to temporarily store bit planes in memory 230 and retrieve the bit planes as needed for communication to SLM 170 via output 270.

Figure 4:
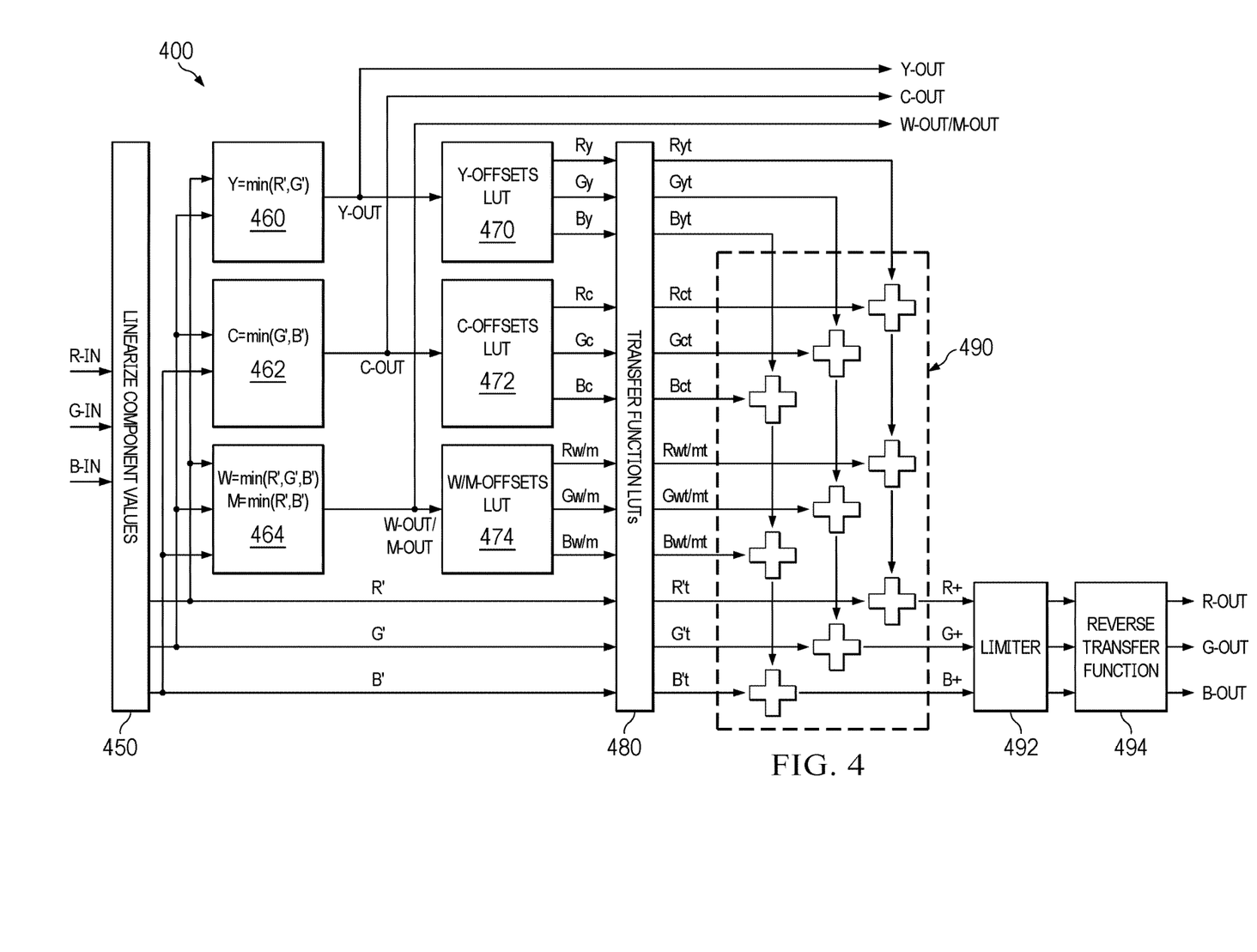
FIG. 4 is a flowchart illustrating additional detail of the flowchart of FIG. 3, including an algorithmic process for upconverting video input stimuli having a number of signals into video output stimuli having a greater number of signals.

FIG. 4 is a flowchart 400 illustrating additional detail of the flowchart 300 of FIG. 3, including an algorithmic process for upconverting video input stimuli having a number of signals into video output stimuli having a greater number of signals. In some examples, the illustrated process is implemented by controller 110. Certain operations involve the MPP 210 using signal information as a read address to perform lookups within a collection of LUTs 250 configured to output values that are usable in upconverting primary signals into multi-primary signals.

In this example, three primary input signals corresponding to red (R-in), green (G-in) and blue (B-in) are upconverted to six multi-primary signals corresponding to red (R-out), green (G-out), blue (B-out), yellow (Y-out), cyan (C-out), and either magenta (M-out) or white (W-out). However, any suitable number of input primary signals may be upconverted to a corresponding combination of output multi-primary signals. In addition, some examples may use input primary signals other than RGB (e.g., YUV, YCbCr, YpbPr, etc.). In an alternative example, for example, three primary input signals corresponding to red (R-in), green (G-in) and blue (B-in) are upconverted into seven multi-primary signals corresponding to red (R-out), green (G-out), blue (B-out), yellow (Y-out), cyan (C-out), magenta (M-out) and white (W-out).

At step 450, MPP 210 converts a respective non-linear component value of each one of the three input primary signals (R-in, G-in and B-in) to a respective linear component value (R', G' and B'). For example, certain video input stimuli may be encoded with a non-linear or logarithmic gamma format, in which more code segments are assigned to the darker portion of the dynamic range than the brighter portion of the dynamic range. Such gamma format encoding is designed to be responsive to human vision, which is generally more discerning of darker grey shades than brighter grey shades. In such an arrangement, step 450 may involve a process that linearizes or "de-gammas" the gamma encoding.

In some examples, the process of converting data from a non-linear format to a linear format may be implemented through use of one or more LUTs 250 included within controller 110. For video input stimuli having RGB signals, MPP 210 may use the non-linear component values for red, green and blue (R-in, Gin and B-in, respectively) to look up corresponding addresses in a conversion LUT 250. The LUT(s) 250 accessed by MPP 210 in step 450 may be configured to provide the linear output component values corresponding to the non-linear input component value used to access a given address.

As steps 460, 462 and 464, MPP 210 generates a respective first-order component value for each one of several multi-primary signals. In some embodiments, the generation of first-order component values may involve upconverting a certain number of primary video signals to a greater number of multi-primary video signals. The upconverting may involve, for example, determining a minimum component value from among a first component value of a first primary video signal and a second component value of a second primary video signal.

In the illustrated example, the multi-primary signals include three signals corresponding to yellow, cyan and either white or magenta, respectively. Each first-order component value may be generated, for example, by MPP 210 evaluating a minimum from among corresponding linearized component values, as outputted from step 450.

For yellow, MPP 210 evaluates the first-order component value at step 460 as the minimum of the red (R') and green (G') linearized components values. For cyan, MPP 210 evaluates the first-order component value at step 462 as the minimum of green (G') and blue (B') linearized components values. If white is used as a multi-primary color, MPP 210 evaluates the first-order component value at step 464 as the minimum of red (R'), green (G') and blue (B') linearized component values. If magenta is used as a multi-primary color, MPP 210 evaluates the first-order component value at step 464 as the minimum of red (R') and blue (B') component values. Thus, where MPP 210 applies minimum algorithm evaluations, the generation of first-order component values for multi-primary signals may be represented as follows:

yellow=minimum(R', G');
cyan=minimum(G', B');
magenta=minimum(R', B');
white=minimum(R', G', B').

Certain examples enable the selective use of either white or magenta as a multi-primary signal, and further enables altering between those options. One way to selectively set the display system 100 to make use of magenta, instead of white, is by MPP 210 setting G' to a maximum value of 1023 at step 450, in which case the output of step 464 would default to the minimum of either R' and B'.

MPP 210 provides first order-component values generated at steps 460, 462 and 464 as outputs for yellow (Y-out), cyan (C-out), and either white (W-out) or magenta (M-out) multi-primary signals, respectively. In addition, MPP 210 evaluates the first-order component values Y-out, C-out and either W-out or M-out to generate respective offset values at steps 470, 472 and 474.

The offset values generated for each multi-primary signal may be configured to compensate for potential intensity differences between a given multi-primary signal and corresponding combinations of the primary signals. For example, if the yellow first-order component value (Y-out) at 20% of full intensity does not correspond to equal parts of red & green primary signals at 20% of full intensity, then derived offset values may be added to red and green to compensate accordingly. By providing such derived offset values, color differences between derived components and primary input stimuli may be trimmed out. In addition, in the context of yellow, for example, the offset values at a given address within a corresponding LUT 250 may be configured to allow outputs Ry and Gy to compensate for any perceived color differences that would otherwise appear due to the delayed application of Y-out to produce yellow, as explained further herein with reference to FIG. 5.

MPP 210 may determine the appropriate offset values to apply using a given first-order component value as a read address to perform a lookup in a corresponding LUT 250, in which each multi-primary signal uses a unique offset LUT 250 relative to each other offset LUT 250. This shall be explained with reference to the Y-out, C-out, and either W-out or M-out multi-primary signals shown in FIG. 4. However, any suitable multi-primary signals may be used.

At step 470, MPP 210 uses the yellow first-order component value (Y-out) as a read address to perform a lookup within a corresponding first offset LUT 250 unique to yellow. The lookup performed within the unique yellow offset LUT 250 outputs three offset values Ry, Gy, and By for yellow.

At step 472, MPP 210 uses the cyan first-order component value (C-out) as a read address to perform a lookup within a corresponding second offset LUT 250 unique to cyan. The lookup performed within the cyan offset LUT 250 outputs three offset values Rc, Gc, and Bc for cyan.

As described above, certain examples enable the selective use of either white or magenta as a multi-primary signal, and further enables altering between those options (e.g., by setting G' to a maximum value of 1023 at step 450). If white is used as a multi-primary color, step 474 involves MPP 210 using the first-order component value for white (W-out) as a read address to perform a lookup within a corresponding third offset LUT 250 unique to white. The lookup performed on the white offset LUT 250 outputs three offset values Rw, Gw, and Bw for white. Alternatively, if magenta is used as a multi-primary color, step 474 involves MPP 210 using the first-order component value for magenta (M-out) as a read address to perform a lookup within a corresponding fourth offset LUT 250 unique to magenta. The lookup performed within the magenta offset LUT 250 outputs three offset values Rm, Gm, and Bm for magenta.

At step 480, MPP 210 uses the respective offset values generated for each multi-primary signal as read addresses to perform lookups within a transfer function LUT 250. To simplify the hardware requirements necessary to implement the algorithmic process of flowchart 400, including certain summation functions, it may be useful to perform a format conversion of certain data. For example, the offset outputs provided by steps 470 (Ry, Gy and By), 472 (Rc, Gc and Bc), and 474 (Rw/m, Gw/m, Bw/m) may be in a floating-point format, whereas certain special-purpose hardware used to implement flowchart 300 may more efficiently perform summation functions when data is in a fixed-point format. Accordingly, step 480 may involve MPP using the data outputs of steps 450, 470, 472, and 474 as read addresses to perform a lookup in a transfer function LUT 250 configured to convert data having a floating-point format to corresponding data having a fixed-point format. Each transfer function LUT 250 may be configured based on one or more mathematical functions for converting data having a floating-point format to corresponding data having a fixed-point format.

For yellow, MPP 210 collectively applies the offset values Ry, Gy, and By to lookup up a corresponding address in a transfer function LUT 250. For cyan, MPP 210 collectively applies the offset values Rc, Gc, and Bc to lookup up a corresponding address in a transfer function LUT 250. For white, MPP 210 collectively applies the offset values Rw, Gw, and Bw to lookup up a corresponding address in a transfer function LUT 250. For magenta, MPP 210 collectively applies the offset lookup values Rm, Gm, and Bm are to lookup up a corresponding address in a transfer function LUT 250. As shown in FIG. 4, step 480 further involves collectively using the linearized R', G' and B' values, outputted from step 450, to read a corresponding address within a LUT 250 that applies an analogous transfer function.

Step 490 involves MPP 210 adding together all the transfer function outputs generated at 380 for each one of the three primary input signals red, green, and blue. As shown in FIG. 4, the summations may be expressed as follows:
(if white is used)

$$red = Ry + Rc + Rw + Rt;$$
$$green = Gc + Gw + Gt;\text{ and}$$
$$blue = By + Bc + Bw + Bt.$$
(alternatively, if magenta is used)
$$red = Ry + Rc + Rm + Rt;$$
$$green = Gc + Gt;\text{ and}$$
$$blue = By + Bc + Bm + Bt.$$

At step 492, MPP 210 applies upper and lower limiter functions to the output of step 490. Certain limits may be selectively applied to make certain the additive functions performed in step 490 are within predetermined bounds. For example, step 492 may determine that adding the summation outputted at step 490 (e.g., Ry+Rc+Rw+Rt) to a corresponding primary video signal (e.g., red) would result in that primary video signal having an offset component value that is greater than or equal to a threshold established for that primary video signal (e.g., 2 to the $14^{th}$ power minus 1 as a threshold for red). If so, MPP 210 may set the offset component value for red to a value that does not exceed the threshold, such that any excess quantization of the offset component value over the corresponding threshold is trimmed off. Step 490 may also set certain values below a predetermined threshold to be equal to that threshold.

At step 494, MPP 210 applies a reverse transfer function to the output of step 492. Where the transfer function applied in step 380 converts data from a floating-point format to a fixed-point format, for example, for example, step 494 involves MPP 210 reversing that conversion by converting the output of step 492 back to a floating-point format. As with step 480, the reverse transfer function applied at step 494 may be implemented by MPP 210 using one or more LUTs 250.

In some examples, execution of flowchart 400 provides as outputs the following six multi-primary signals: Y-out, C-out, R-out, G-out, B-out and either W-out or M-out. In some examples, seven multi-primary signals are provided where both W-out and M-out are provided. Thus, execution of flowchart 400 enables the real-time conversion of video input stimuli having three signals (e.g., RGB) into video output stimuli having at least six multi-primary signals. The conversion happens in real-time in that, upon execution of the upconverting process, the outputted multi-primary signals are instantly used by display system 100 to render a respective bit plane for each one of the multi-primary signals. The output provided by flowchart 400 is used to create corresponding color bit planes in real time, preparatory to their immediate display, each bit plane corresponding to a respective one of the multi-primary signals.

The upconverting algorithm described with reference to FIG. 4, including the appropriate values recorded in the LUTs 250, may be configured to compensate for unique attributes of the multi-primary signals used. The conversion of primary signals to additional multi-primary signals gives rise to unique challenges. As disclosed above, dither quality may be impacted by providing SLM 170 with colored light beams 182 that are relatively bright. Because of the relative brightness of yellow, for example, and due to the ability of the human eye to better discern color differences at lower brightness intensities, there may be noticeable dither noise if yellow light beams are used to create a color at low intensity.

Figure 5:
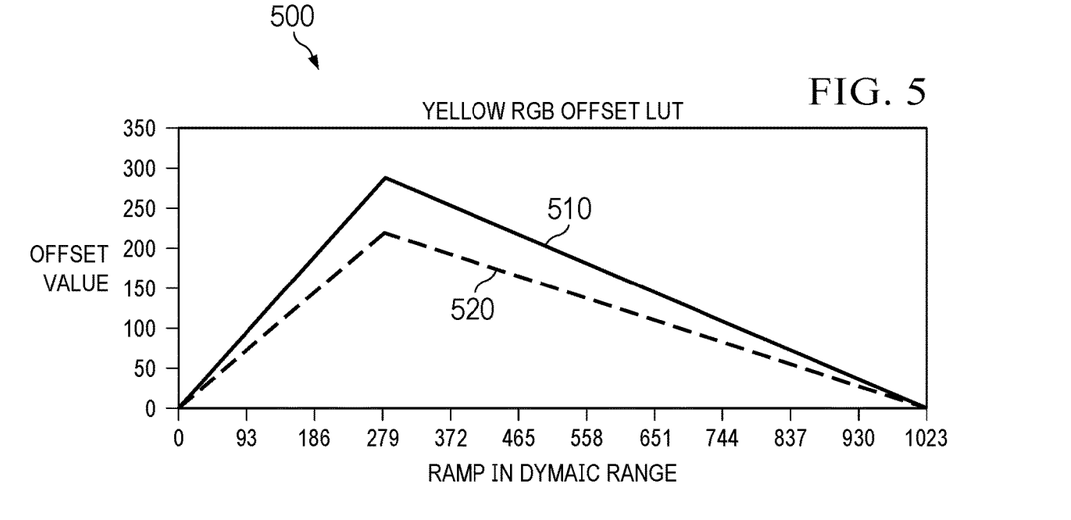
FIG. 5 is a chart plotting example values that may be stored at appropriate addresses in a lookup table (LUT) configured to compensate for delay applied to a yellow multi-primary signal.
Figure 6:
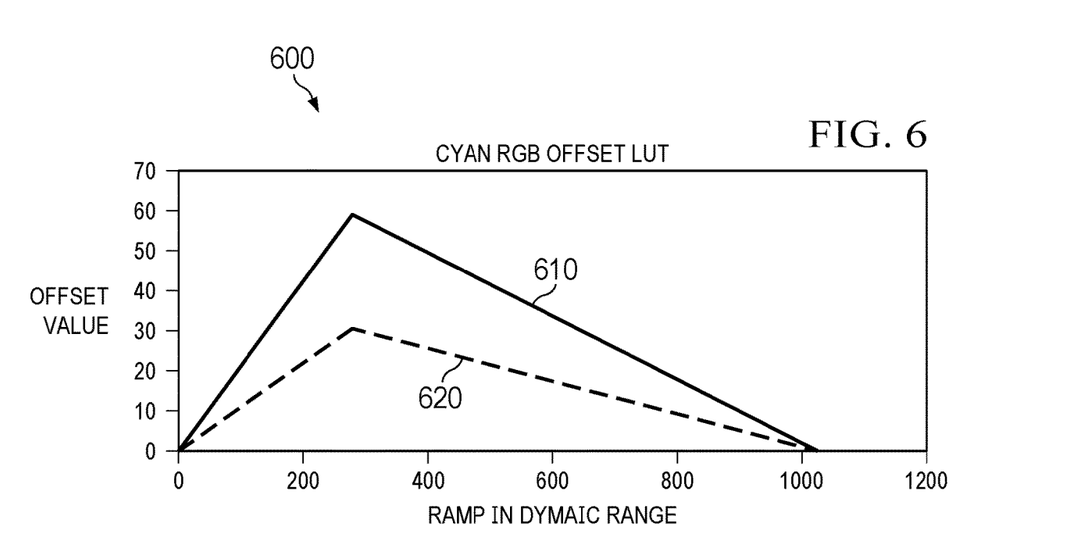
FIG. 6 is a chart plotting example values that may be stored at appropriate addresses in a corresponding LUT configured to compensate for delay applied to a cyan multi-primary signal.
Figure 7:
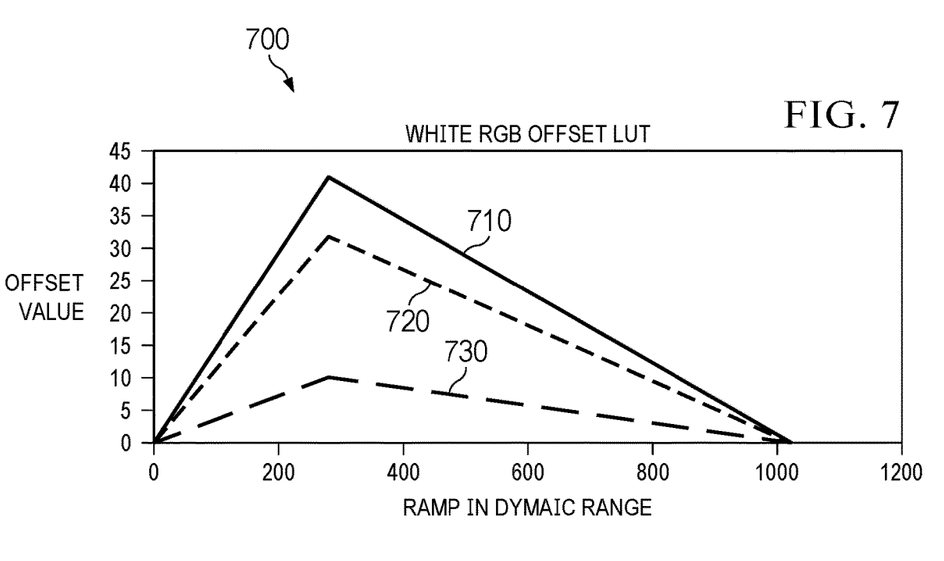
FIG. 7 is a chart plotting example values that may be stored at appropriate addresses in a corresponding LUT configured to compensate for delay applied to a white multi-primary signal.

To mitigate dither noise, and to otherwise optimize the visual output quality of a display system 100, the offset LUTs 250 used in steps 470, 472 and 474 may be configured to purposefully delay, with respect to dynamic range, the application of certain multi-primary bit planes (e.g., yellow, cyan, white, or magenta). As shown in FIG. 5, for example, a combination of the red and green primary bit planes may be used to compensate for the delay applied to yellow multi-primary bit planes. Example delays applied to white and cyan bit planes are shown in FIGS. 6 and 7, respectively.

Use of the word "delay" in the disclosed context does not necessarily refer to time, but may also or alternatively refer to the dynamic range applied to a given multi-primary signal. Thus, the x-axis for the charts shown in FIGS. 5-7 represents a ramp in dynamic range for a multi-primary signal, where black maps to 0 and full-on brightness maps to 1023. As shown in FIGS. 5-7, certain multi-primary signals may not be applied or turned "on" until a brighter portion of the dynamic range. The y-axis coordinate for each point along the plots shown in FIGS. 5-7 indicates the corresponding output offset values of a respective offset LUT 250 along the dynamic range of a respective multi-primary signal, as determined at steps 470, 472, or 474 of FIG. 4.

FIG. 5 is a chart 500 plotting example values that may be stored at appropriate addresses in the LUT 250 used to determine the Y-OFFSETS at step 470 of FIG. 4. As disclosed above with reference to FIG. 4, the address read in the Y-OFFSETS LUT 250 (at step 470) may be used to compensate for delay applied to a yellow multi-primary signal. In this example, the application of yellow as a multi-primary signal is delayed until the concurrent inflection points of plots 510 and 520, which is shown at approximately dynamic range value 279. Although this example has an inflection point at approximately dynamic range value 279 for both plots 510 and 520, any suitable inflection point(s) may be used that avoids applying the yellow multi-primary signal at lower intensities that would give rise to unacceptable levels of dither noise. The amount of delay and corresponding offset compensation may be configured such that the intensity of yellow visually appears as if there had been no delay in applying non-zero intensity component values to the yellow multi-primary signal.

Plots 510 and 520 represent example additive offsets applied to red and green, respectively, over dynamic range values 0 through 1023. In this example, the additive offset of red 510 linearly increases from 0 to approximately 300 as the dynamic range progresses from values 0 through approximately 279, at which point the additive offset of red linearly decreases back to 0 for the remainder of the dynamic range values through 1023. The additive offset of green 520 linearly increases from 0 to approximately 220 as the dynamic range progresses from values 0 through approximately 279, at which point the additive offset of green 520 linearly decreases back to 0 for the remainder of the dynamic range values through 1023.

FIG. 6 is a chart 600 plotting example values that may be stored at appropriate addresses in the LUT 250 used to determine the C-OFFSETS at step 472 of FIG. 4. As disclosed above with reference to FIG. 4, the address read in the C-OFFSETS LUT 250 (at step 472) may be used to compensate for delay applied to a cyan multi-primary signal. In this example, the application of cyan as a multi-primary signal is delayed until the concurrent inflection points of plots 610 and 620, which is shown at approximately value 290. After sufficient delay and once the cyan multi-primary signal is added in, it may be a different color than the same level of intensity of green and blue combined, and compensation to green or blue is applied accordingly, as shown in FIG. 6. The amount of delay and corresponding offset compensation may be configured such that the intensity of cyan visually appears as if there had been no delay in applying non-zero intensity component values the cyan multi-primary signal.

Plots 610 and 620 represent example additive offsets of blue and green, respectively, over dynamic range values 0 through 1023. In this example, the additive offset of blue 610 linearly increases from 0 to roughly 60 as the dynamic range progresses from values 0 through approximately 290, at which point the additive offset of blue 610 linearly decreases back to 0 through approximately dynamic range value 1100. The intensity component value of green 620 linearly increases from 0 to roughly 30 as the dynamic range progresses from values 0 through 290, at which point the additive offset of green 620 linearly decreases back to 0 through approximately dynamic range value 1100. Although this example has an inflection point at approximately dynamic range value 290 for both plots 610 and 620, any suitable inflection point(s) may be used that avoids applying the cyan multi-primary signal at lower intensities that would give rise to unacceptable levels of dither noise.

FIG. 7 is a chart 700 plotting example values that may be stored at appropriate addresses in the LUT 250 used to determine the W/M-OFFSETS at step 474. As disclosed above with reference to FIG. 4, the address read in the W/M-OFFSETS LUT 250 (at step 474) may be used to compensate for delay applied to a white multi-primary signal. In this example, the application of white as a multi-primary signal is delayed until the concurrent inflection points of plots 710, 720 and 730, which is shown at approximately dynamic range value 290. After sufficient delay and once the white multi-primary signal is added in, it may be a different color than the same level of intensity of red, green, and blue combined, and compensation to red, green or blue is applied accordingly, as shown in FIG. 7. The amount of delay and corresponding offset compensation may be configured such that the intensity of cyan visually appears as if there had been no delay in applying non-zero intensity component values to the white multi-primary signal.

Plots 710, and 720 and 730 represent example additive offsets for red, green and blue, respectively, over dynamic range values 0 through 1023. In this example, the additive offset of red 710 linearly increases from 0 to approximately 41 as the dynamic range progresses from values 0 through approximately 290, at which point the additive offset of red linearly decreases back to 0 through approximately dynamic range value 1100. The additive offset of green 720 linearly increases from 0 to approximately 32 as the dynamic range progresses from dynamic range values 0 through approximately 290, at which point the additive offset of green 620 linearly decreases back to 0 through approximately dynamic range value 1100. The additive offset of blue 610 linearly increases from 0 to approximately 10 as the dynamic range progresses from dynamic range values 0 through approximately 290, at which point the additive offset of blue 730 linearly decreases back to 0 through approximately dynamic range value 1100. Although this example has an inflection point at approximately dynamic range value 290 for plots 710, 720 and 730, any suitable inflection point(s) may be used that avoids applying the cyan multi-primary signal at lower intensities that would give rise to unacceptable levels of dither noise.

As shown in FIGS. 5-7, a combination of primary signals may be used to compensate of the delayed application of certain multi-primary signals. The controlled compensation may be optimized to produce a smooth, linear ramp output for the corresponding color.

The operations of the systems and apparatuses may be performed by more, fewer, or other components. The methods may include more, fewer, or other steps. Additionally, steps may be performed in any suitable order. Particular operations of the systems and apparatuses disclosed herein may be performed using any suitable logic embodied in computer-readable media. As used in this document, "each" refers to each member of a set or each member of a subset of a set, where a set in this context may consist of one member or multiple members.

To aid the Patent Office, and any readers of any patent issued on this application, in interpreting the claims appended hereto, applicant notes that there is no intention that any of the appended claims invoke paragraph 6 of 35 U.S.C. § 112 as it exists on the date of filing hereof unless the words "means for" or "step for" are explicitly used in the particular claim.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the examples herein that a person having ordinary skill in the art would comprehend. Similarly, where appropriate, the appended claims encompass all changes, substitutions, variations, alterations, and modifications to the examples herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A display system, comprising:
   a spatial light modulator (SLM) comprising pixel elements; and
   a circuit comprising a control processor, the circuit communicatively coupled to the SLM, the circuit configured to:
      convert M primary video signals to N multi-primary video signals, wherein N and M are positive integers and N is greater than M;
      use a first multi-primary video signal of the N multi-primary video signals to derive a first additive offset for a first primary video signal of the M primary video signals;
      use the first multi-primary video signal to derive a second additive offset for a second primary video signal of the M primary video signals;
      add the first additive offset to the first primary video signal; and
      add the second additive offset to the second primary video signal;
      derive a bit plane based on the first primary video signal having the first additive offset added thereto; and
      transmit the bit plane to the SLM to selectively control on and off states of the pixel elements of the SLM.

2. The display system of claim 1, wherein the first multi-primary video signal has a component value used by the control processor to look up a first address in a first lookup table (LUT), the first LUT configured to contain the first additive offset at the first address.

3. The display system of claim 2, wherein the first multi-primary video signal has a component value used by the control processor to look up a second address in a second LUT, the second LUT configured to contain the second additive offset at the second address.

4. The display system of claim 1, wherein the circuit is further configured to convert the M primary video signals to the N multi-primary video signals by determining a minimum component value from among a first component value of the first primary video signal and a second component value of the second primary video signal.

5. The display system of claim 1, wherein the circuit is further configured to convert a non-linear component value of the first primary video signal to a linear component value.

6. The display system of claim 1, wherein the circuit is further configured to:
  determine that adding the first additive offset to the first primary video signal results in the first primary video signal having an offset component value that is greater than or equal to a threshold; and
  set the offset component value of the first primary video signal to a value that does not exceed the threshold.

7. The display system of claim 1, wherein M is equal to three and N is greater than or equal to six.

8. The display system of claim 1, wherein the circuit is further configured to generate a plurality of bit planes corresponding to the first multi-primary video signal, each bit plane selectively controlling the on and off states of the pixel elements of the SLM.

9. A method comprising:
  at a circuit, converting M primary video signals to N multi-primary video signals, wherein N and M are positive integers and N is greater than M;
  at the circuit, using a first multi-primary video signal of the N multi-primary video signals to derive a first additive offset to a first primary video signal of the M primary video signals;
  at the circuit, using the first multi-primary video signal to derive a second additive offset for a second primary video signal of the M primary video signals;
  at the circuit, adding the first additive offset for the first primary video signal; and
  at the circuit, adding the second additive offset to the second primary video signal.

10. The method of claim 9, wherein the first additive offset is derived by looking up a first address in a first lookup table (LUT), the first LUT configured to contain the first additive offset at the corresponding address.

11. The method of claim 10, wherein the second additive offset is derived by looking up second address in a second LUT, the second LUT configured to contain the second additive offset at the corresponding address.

12. The method of claim 9, wherein converting the M primary video signals to the N multi-primary video signals includes the circuit determining a minimum component value from among a first component value of the first primary video signal and a second component value of the second primary video signal.

13. The method of claim 9, further comprising, at the circuit, converting a non-linear component value of the first primary video signal to a linear component value.

14. The method of claim 9, further comprising:
  at the circuit, determining that adding the first additive offset to the first primary video signal results in the first primary video signal having an offset component value that is greater than or equal to a threshold; and
  at the circuit, setting the offset component value of the first primary video signal to a value that does not exceed the threshold.

15. The method of claim 9, wherein M is equal to three and N is greater than or equal to six.

16. The method of claim 9, further comprising, at the circuit, generating a plurality of bit planes corresponding to the first multi-primary video signal, each bit plane selectively controlling on and off states of each pixel element of an array of pixel elements of an SLM communicatively coupled to the circuit.

17. A circuit, comprising:
  an input configured to receive M primary video signals;
  an output configured to output a plurality of bit planes, each bit plane corresponding to a respective one of N multi-primary video signals, where N and M are positive integers and N is greater than M; and
  a control processor configured to:
    use a first multi-primary video signal of the N multi-primary video signals to derive a first, second and third additive offsets for a first primary video signal of the M primary video signals;
    use the first multi-primary video signal to derive a fourth, fifth and six additive offsets for a second primary video signal of the M primary video signals;
    add the first, second, and third additive offsets to the first primary video signal;
    add the fourth, fifth, and sixth additive offsets to the second primary video signal; and
    derive a bit plane of the plurality of bit planes based on the first, second and third additive offsets added to the first primary video signal and the fourth, fifth, and sixth additive offsets added to the second primary video signal.

18. The circuit of claim 17, wherein the first multi-primary video signal has a component value used by the circuit to look up a first address in a first lookup table (LUT), the first LUT configured to contain the first additive offset at the first address.

19. The circuit of claim 18, wherein the first multi-primary video signal has a component value used by the circuit to look up a second address in a second LUT, the second LUT configured to contain the second additive offset at the second address.

20. The circuit of claim 17, wherein the circuit is further configured to convert the M primary video signals to the N multi-primary video signals by determining a minimum component value from among a first component value of the first primary video signal and a second component value of the second primary video signal.

* * * * *